United States Patent [19]

Vogt

[11] 3,760,274

[45] Sept. 18, 1973

[54] MODULATION OF POLARIZATION ORIENTATION AND CONCURRENT CONVENTIONAL MODULATION OF THE SAME RADIATED CARRIER

[75] Inventor: Gottfried F. Vogt, Lincroft, N.J.

[73] Assignee: The United States of America as represented by the Secretary of the Army

[22] Filed: Oct. 13, 1971

[21] Appl. No.: 188,407

[52] U.S. Cl. ........................ 325/26, 325/28, 325/48, 325/60, 343/100 PE, 328/155

[51] Int. Cl. ............................................ H04b 7/00

[58] Field of Search .................. 325/28, 48, 49, 60, 325/56, 26; 343/100 PE; 179/15 BC; 328/155

[56] References Cited

UNITED STATES PATENTS

| | | | |
|---|---|---|---|
| 3,092,828 | 6/1963 | Allen | 325/56 |
| 3,500,207 | 3/1970 | Ruthroff | 325/60 |
| 3,311,829 | 3/1967 | Gillett | 325/56 |
| 3,435,454 | 3/1969 | Vogt | 343/100 PE |
| 3,238,527 | 3/1966 | Vogt | 343/100 PE |
| 3,353,182 | 11/1967 | Hart | 343/100 PE |

*Primary Examiner*—Albert J. Mayer
*Attorney*—Harry M. Saragovitz et al.

[57] ABSTRACT

A radio transmission system comprising transmitting and receiving facilities for modulating and detecting respectively the orientation angle of linear polarization of a radiated carrier and including provision for concurrent conventional modulation of the carrier.

5 Claims, 5 Drawing Figures

Patented Sept. 18, 1973 3,760,274

3 Sheets-Sheet 1

INVENTOR.
GOTTFRIED F. VOGT

BY Arthur L. Bowers AGENT
Harry M. Saragovitz
Edward J. Kelly
Herbert Berl ATTORNEYS Patented Sept. 18, 1973 3,760,274

3 Sheets-Sheet 2

INVENTOR.
GOTTFRIED F. VOGT

BY Arthur L. Bowers AGENT
Harry M. Saragovitz
Edward J. Kelly
Herbert Berl ATTORNEYS

INVENTOR.
GOTTFRIED F. VOGT

BY Arthur L. Bowers AGENT
Harry M. Saragovitz
Edward J. Kelly
Herbert Berl ATTORNEYS

MODULATION OF POLARIZATION ORIENTATION AND CONCURRENT CONVENTIONAL MODULATION OF THE SAME RADIATED CARRIER

BACKGROUND OF THE INVENTION

In using the electromagnetic wave as a carrier for the transmission of message signals, it is common practice to modulate the amplitude or phase of the carrier with the message signals while the orientation of the angle of linear polarization of the carrier is held constant usually, but not necessarily, vertically or horizontally. Since the polarization vector of the radiated carrier and the radiating dipole antenna are in the same plane, the orientation of the angle of linear polarization can be displaced angularly by angularly displacing the dipole antenna. While it might be possible to transmit information by this mechanical technique, it is necessarily limited to simple and to low frequency messages. Also, there isn't a satisfactory receiver for detecting messages transmitted by modulation of polarization orientation.

SUMMARY OF THE INVENTION

This invention concerns an electronic method for sweeping back and forth the orientation angle of linear polarization of a radiated carrier at varying angular velocity in the rhythm of a message signal and detecting the message signal thus transmitted at a receiver. While this modulation takes place in the space domain, the carrier may be further modulated along the time axis or propagation direction with the same or another message signal, i.e. by conventional FM.

Figure 1:
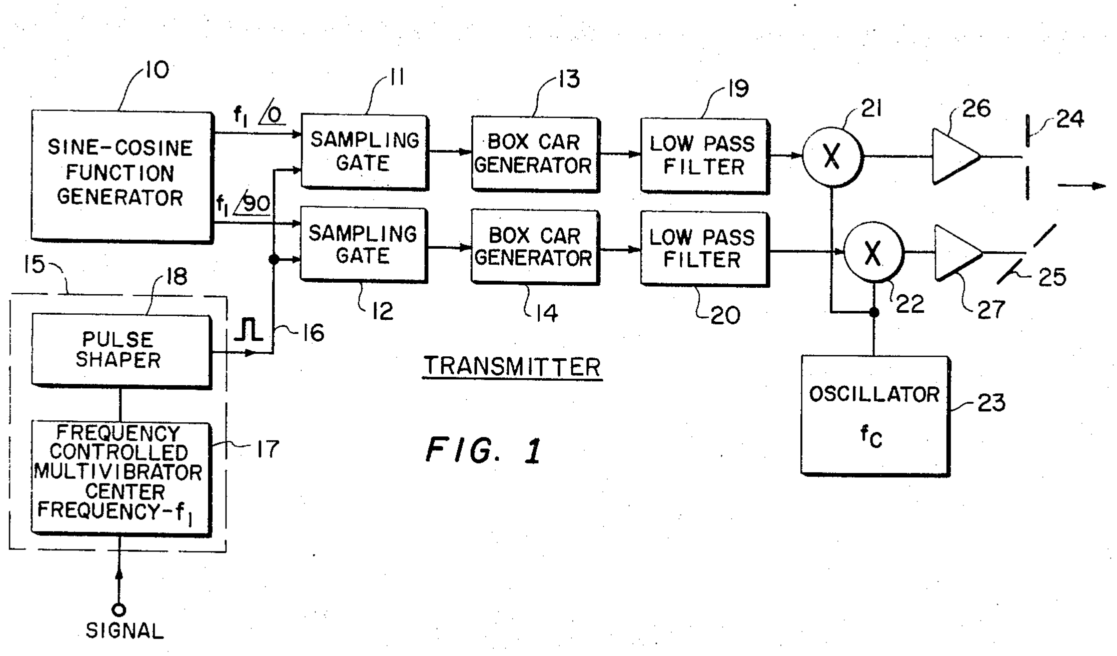
FIG. 1 is a block diagram of an embodiment of a transmitter for modulation of polarization orientation only of a carrier in accordance with this invention.

There is shown in FIG. 1 a transmitter that includes a sine-cosine function generator 10 for supplying two sinusoidal outputs $f_1$ of identical frequency and amplitude, phase displaced ninety degrees and designated $f_1$ 0 and $f_1$ 90 in FIG. 1. Each of the sinusoidal outputs are delivered to one of the two input terminals of one of the two sampling gates 11 and 12, respectively. The sampling gates 11 and 12 are normally closed and are open only during the time that gating voltage is applied to the other input terminals of the sampling gate, and when open, the voltages of the two sinusoidal waveforms respectively at the moment of gating are delivered by the sampling gates to box car generators 13 and 14 which retain the voltage of each sample until the next sample. Gating voltage is provided by pulse source 15. Pulse source 15 generates pulses of a length that are very short compared to the period of the outputs of the sine-cosine function generator. The gating pulses are delivered by conductor 16 to the other input terminal of each of the two sampling gates 11 and 12. Circuits including a sine-cosine function generator, sampling gates and box car generators that may be used in this invention are described in U.S. Pat. Nos. 3,238,527; 3,435,454 and 3,524,139, issued to G. F. Vogt. The pulse source 15 includes a frequency controlled multivibrator 17 operating unmodulated or at center frequency $f_1$, identical to the frequency of the outputs of sine-cosine function generator 10. A pulse shaper 18 is connected between the output of multivibrator 17 and the sampling gates 11 and 12.

When there is no voltage input to the signal terminal of multivibrator 17, multivibrator 17 operates at frequency $f_1$ and the output voltages of box car generators 13 and 14 are essentially constant level dc; the magnitudes of the dc outputs are determined by the phase of the pulses from pulse source 15 relative to the outputs of the sine-cosine function generator. A steady dc voltage input to the voltage controlled multivibrator 17 increases or decreases the frequency of multivibrator 17 depending upon the polarity of the dc input, resulting in waveforms at the outputs of the box car generators 13 and 14 that are approximately sinusoidal, 90° out of phase relative to one another, and of that frequency which is the algebraic difference of the frequencies of the output of sine-cosine function generator 10 and multivibrator 17.

Low pass filters 19 and 20 are connected to the outputs of box car generators 13 and 14, rejecting the frequency $f_1$ and also limiting the sideband spectrum to that required under the circumstances of use. Multipliers 21 and 22 are connected to the outputs of low pass filters 19 and 20, respectively, and to the output of an oscillator 23. If the output of oscillator 23 is designated $f_C$, and if the output frequency from filters 19 and 20 is designated $f_r$, the output of one multiplier is proportional to the product of $\cos 2\pi f_r \cdot \sin 2\pi f_C$ and the output of the other multiplier is proportional to the product of $\sin 2\pi f_r \cdot \sin 2\pi f_C$. Crossed dipole antennas 24 and 25 are coupled by wide band power amplifiers 26 and 27 to the outputs of multipliers 21 and 22. For the operating conditions described, the dipoles 24 and 25, oriented vertically and horizontally for purposes of this description, radiate energy waveforms as follows:

$$E_y = \sin \omega_r t \cdot \sin \omega_C t$$

$$E_x = \cos \omega_r t \cdot \sin \omega_C t$$

where $E_y$ is the instantaneous amplitude of the voltage emitted by vertical dipole 24;

$E_x$ is the instantaneous amplitude of the voltage emitted by horizontal dipole 25;

$\omega_C$ is $2\pi$ times the frequency of oscillator 23;

$\omega_r$ is $2\pi$ times the frequency outputs from the low pass filters for a predetermined dc voltage input to multivibrator 17;

the subscripts $C$ and $r$ represent the terms carrier and rotation, respectively, and amplitude constants and arbitrary phase angles are omitted.

The above equations correspond to those for double-sideband suppressed carrier modulation. The equations are illustrated graphically and vectorially in FIG. 2.

Figure 2:
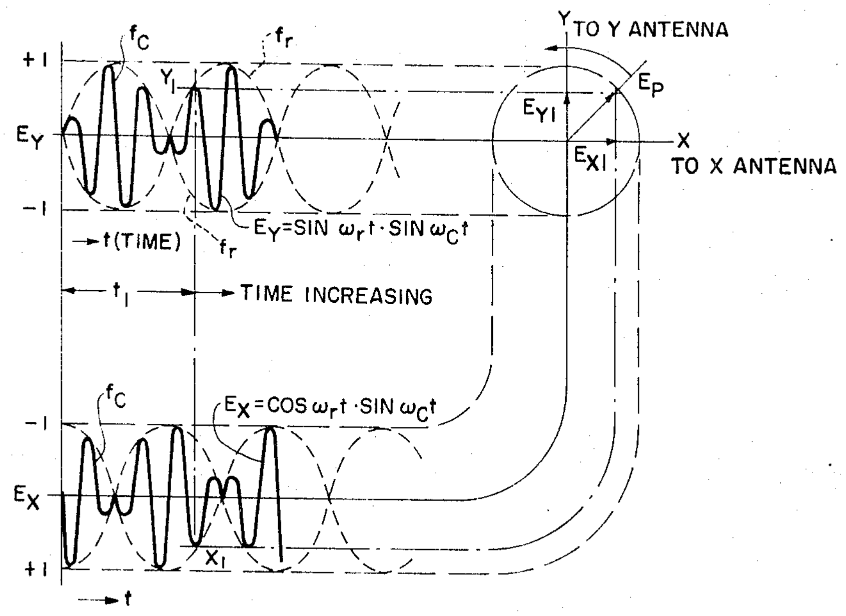
FIG. 2 is a combined waveform and vector drawing illustrating the principles of operation of the transmitter shown in FIG. 1.

In FIG. 2, the upper and lower waveforms shown in solid lines are $f_C$ and are zero or 180° out of phase. The envelopes shown in broken lines are $f_r$. At every zero crossing of $f_r$, $f_C$ changes phase 180°. For purposes of this explanation, it is presumed that the circuit is symmetrical. Thus, the envelopes of the upper and lower waveforms have equal amplitudes which are designated arbitrarily plus one and minus one. The envelopes are 90° out of phase. The polarization vector $E_p$ is the vector sum of $E_x$ and $E_y$. At the time $t_1$, $E_{y1}$ and $E_{x1}$ sum to $E_{p1}$ at angle $\alpha_1$. $E_p$ rotates at the angular rate $\omega_r$. If the polarity of the dc voltage input to multivibrator 17 is reversed, the direction of rotation of $E_p$ is reversed. Receiving techniques for circularly polarized radiation are disclosed in the prior art as for example U.S. Pat. No. 3,093,824.

If the signal voltage to multivibrator 17 is sinusoidal, the graphical showing in FIG. 2 still applies but needs to be interpreted on an instantaneous basis. The curves shown are for one particular voltage at the input of multivibrator 17; at the next instant, when the signal voltage is higher or lower, $f_r$ is changed accordingly and the period of the envelope waveform is decreased or increased. If the signal changes continuously, the envelope period changes continuously along the time base, and the angular velocity of vector $E_p$ changes continuously. For each change in signal polarity, the envelope waveform passes through frequency zero and the envelope frequency changes phase direction with the result that the vector $E_p$ changes direction of rotation. The polarization vector $E_p$ oscillates with the FM modulation of frequency $f_1$ of multivibrator 17 where the FM modulation includes the significant sidebands transmitted by the low pass filters 19 and 20. When the message signal to multivibrator 17 is a varying frequency sinusoid, rather than a steady frequency sinusoid, and $f_p$ represents the frequency of the message signal and $\Delta f_p$ is the maximum frequency deviation, the FM output of multivibrator 17 may be expressed in simplified form as $$\Omega p = \cos\,(\omega_1 t + I_p \cos\,\omega_p t)$$

where $$\omega p = 2\pi fp,\ \omega_1 = 2\pi f_1$$

$$Ip = \Delta fp/fp$$

By substituting $P$ for $Ip \cos\,\omega_p t$ $$\Omega p = \cos\,(\omega_1 t + P).$$

The sampling process heterodynes $\Omega p$ down to zero center frequency with the waveforms sin $\omega_1 t$ and cosine $\omega_1 t$ from the sine-cosine function generator. Thus $$\sin\,[(\omega_1 t + P) - \omega_1 t] = \sin\,P$$

$$\cos\,[(\omega_1 t + P) - \omega_1 t] = \cos\,P$$

and sin $P$ and cos $P$ are the outputs delivered by low pass filters 19 and 20 to the multipliers 21 and 22. Sin P and cos P represent zero centered frequency modulations. The modulation of the orientation angle of linear polarization follows the same operating principles where the signal input to multivibrator 17 is more complex, e.g. voice.

Analogous to the functions of multipliers 21 and 22, the antennas 24 and 25 radiate waveforms as follows:

$$E_y = \sin\,P \cdot \sin\,\omega_C t = \sin\,P \cdot \sin\,C$$

$$E_x = \cos\,P\,\sin\,\omega_C t = \cos\,P \cdot \sin\,C$$

Figure 3:
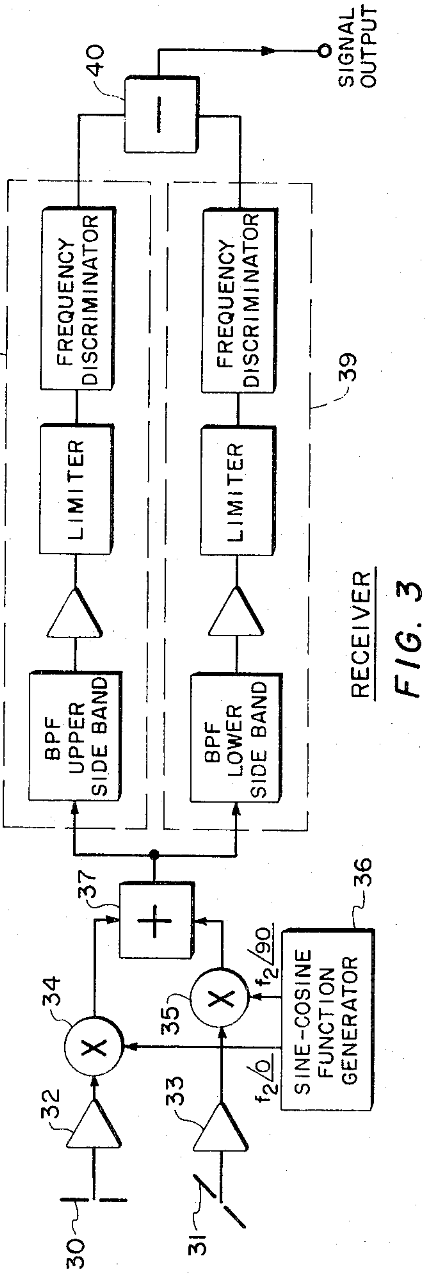
FIG. 3 is a block diagram of a receiver for use with the transmitter of FIG. 1.

In FIG. 3, there is shown a companion receiver for the transmitter of FIG. 1. The receiver includes a pair of crossed dipole antennas 30 and 31 oriented as dipoles 24 and 25, and coupled to amplifiers 32 and 33 that include the necessary filters for the band emitted by the transmitter. Assuming the dipoles of transmitter and receiver are vertical and horizontal though they need not be, the receiver dipoles sense the vertical $A_y$ and horizontal $A_x$ components of the intercepted rf emitted by the transmitter. Multipliers 34, 35 are connected to the outputs of amplifiers 32 and 33 and to the outputs of a sine-cosine function generator 36 which provide the waveforms $f_2$ 0 and $f_2$ 90. The connections to sine-cosine function generator 36 may be reversed. If $2\pi f_2 t = B$, and $2\pi f_C t = C$, the products from multipliers 34 and 35 are $$A_y = \cos\,C\,\sin\,P\,\sin\,B$$

$$A_x = \cos\,C\,\cos\,P\,\cos\,B$$

The products are added in summing circuit 37. The sum $S$ obtained in the summing circuit is $$S = \cos\,C\,\cos\,(B - P)$$

$$= \cos\,(C + B - P) + \cos\,(C - B + P)$$

C and B represent carriers of constant frequency while P is described by the frequency excursion initially provided by frequency controlled multivibrator 17 in FIG. 1. For example, C and B may be 30MHz and 7MHz, respectively and P may cover a frequency band of plug or minus 20KHz. Two conventional receiver channels 38 and 39 having band pass filters (BPF) for $C + B$ and $C - B$, the upper and lower sidebands respectively, are connected to the output of summing circuit 37. In the given example, the upper sideband channel is located at center frequency 37MHz and its frequency excursion is minus P moving toward lower frequencies while the lower sideband channel is located at center frequency 23MHz with a frequency excursion of plus P moving toward higher frequencies. The two FM channels employ FM-discriminators with identical transfer functions. In the chosen configuration, P moves with opposite sign and the message signals provided by the FM channels 38 and 39 will be 180° out of phase. Difference circuit 40 provides the phase reversal for obtaining the combined message signal ($-2 \cos\,2\pi f_p t$).

The communication system described transmits information by modulation of the orientation angle of linear polarization only. The system shown in FIGS. 1 and 2 modified as shown in FIGS. 4 and 5 can transmit either different or identical information by conventional FM modulation of the same carrier that transmits information by the modulation of the orientation angle of linear polarization.

Figure 4:
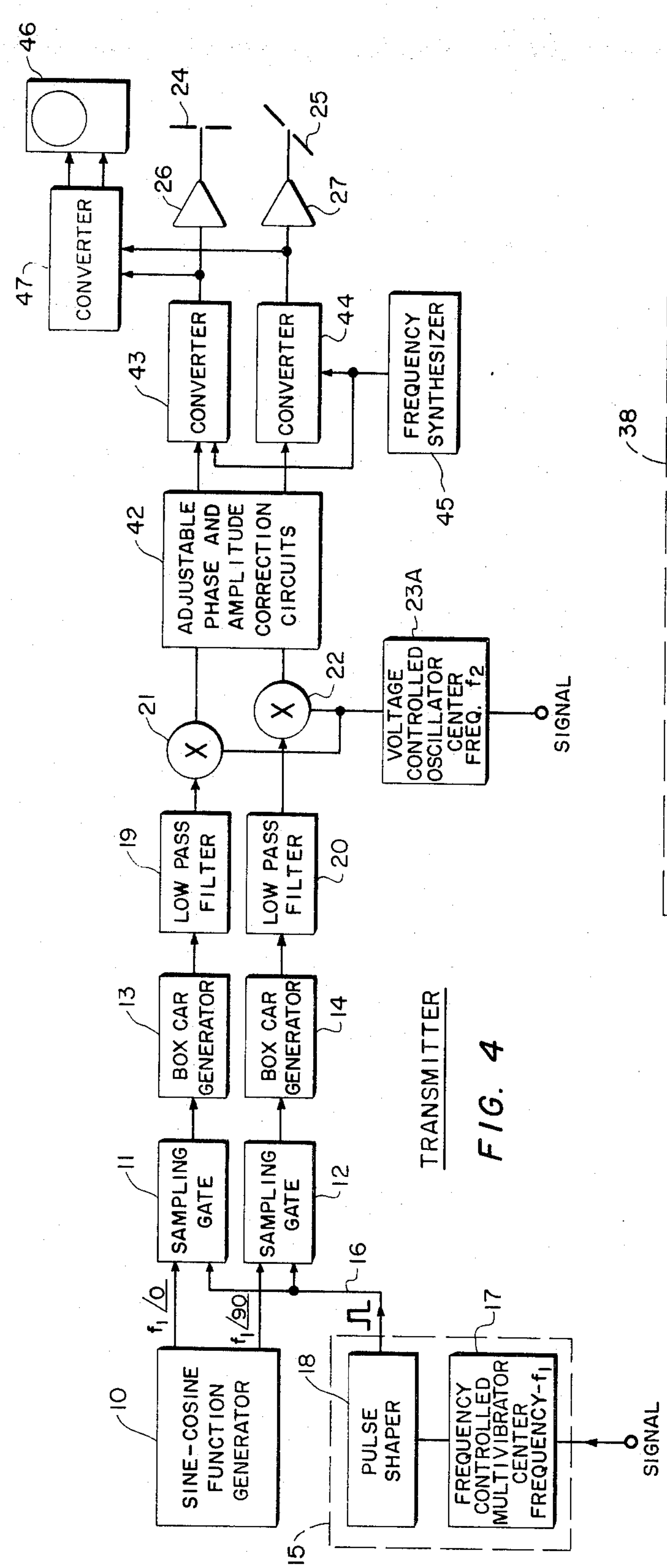
FIGS. 4 and 5 are companion transmitter and receiver, respectively, for communication by modulation of polarization orientation and concurrent conventional modulation of the same carrier.
Figure 5:
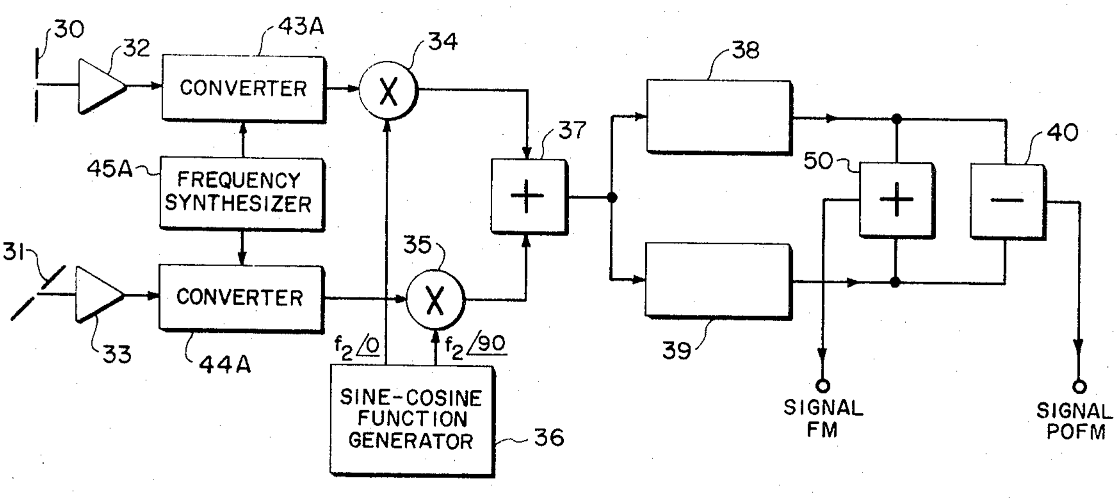

In the transmitter and receiver shown in FIGS. 4 and 5, circuit sections designated with the same reference characters used in FIGS. 1 and 3 designate the same circuit sections as in FIGS. 1 and 3. The transmitter in FIG. 4 includes a voltage controlled oscillator 23A instead of fixed frequency oscillator 23 for providing an output that is FM modulated by an input signal independent of the signal input to multivibrator 17. The outputs of multipliers 21 and 22 are coupled to adjustable phase and amplifier correction circuits 42 for minimizing distortion of the polarization modulation signal. Correction circuits 42 are omitted from FIG. 1 for the sake of simplified description; also for a single signal input to multivibrator 17, distortion may be tolerated. Corrected outputs from multipliers 21 and 22 in FIG. 4 are delivered to frequency converters 43 and 44 to which is coupled frequency synthesizer 45 for translating the frequency band upward or downward. The phase and amplifier correction circuits 42 are adjusted with the aid of a monitor scope 46. A converter 47 for the scope retranslates the band down to that most effective for scope 46. The correction circuits are adjusted so that a rotating straight line appears on the scope and the end of the line traces a circle. Correction is required when the straight line deforms to an ellipse or the end point traces an ellipse.

The FM function in the output of the oscillator 23A is $$F = I_f \cos \omega_f t$$

where $\omega_f = 2\pi f_f$ is the signal input to oscillator 23A $I_f = \Delta f_f / f_f$ is the modulation index The FM signal output from oscillator 23A is $$\Omega F = \cos (C_1 + F)$$

where $C_1 = 2\pi$ times the center frequency of oscillator 23A. The output product from multiplier 21 is $$E_y = \sin \mathrm{P} \cos (C_1 + F)$$

The output product from multiplier 22 is $$E_x = \cos \mathrm{P} \cos (C_1 + F)$$

Though the antennas radiate at an upwardly translated frequency by operation of converters 43 and 44 and frequency synthesizer 45, this frequency conversion does not affect the validity of the preceding equations.

The receiver in FIG. 5 is the companion equipment for the transmitter shown in FIG. 4; it differs from the receiver in FIG. 3 in that it includes converters 43A and 44A and frequency synthesizer 45A for performing the obverse of the frequency translation operation by converters 43, 44 and frequency synthesizer 45 in the transmitter in FIG. 4. The multipliers 33 and 34 are coupled to a sine-cosine function generator 36 as in FIG. 1; the other input to multiplier 34 is $$E_y = \sin P \cos (C_1 + F)$$

and the other input to multiplier 35 is $$E_x = \cos P \cos (C_1 + F)$$

The receiving antennas 30 and 31 are excited by the voltages $E_y$ and $E_x$ as defined in the immediately preceding equations. The outputs of multipliers 34 and 35 are $$A_y = \cos (C_1 + F) \sin P \sin B$$

$$A_x = \cos (C_1 + F) \cos P \cos B$$

As in FIG. 1, these outputs are added in summing circuit 37 to provide the sum S where $$S = \cos (C_1 + F) \cos (B - P)$$

$$= \cos [(C_1 + F) + (B - P)] + \cos [(C_1 + F) - (B - P)]$$

$$= \cos [(C_1 + B) + (F - P)] + \cos [(C_1 - B) + (F + P)]$$

Two conventional FM receiver circuits 38 and 39 as in FIG. 1 tuned to the upper sideband $C_1 + B$ and the lower sideband $C - B$ respectively are coupled to the output of summing circuit 37. Phase contributions by the FM function F produced at oscillator 23A and of the polarization function P are made to the upper sideband as well as to the lower sideband. However, in the upper sideband, the combined contribution is F minus P and in the lower sideband the combined contribution is F plus P. Difference circuit 40 and sum circuit 50 are connected in parallel to the outputs of the FM receiver circuits 38 and 39. In the difference circuit 40, fractions of the signal transmitted by polarization modulation are combined in phase and are delivered as signal POFM and the message transmitted by conventional FM is cancelled. Conversely in the sum circuit 50, fractions of the signal transmitted by conventional FM are combined in phase and are delivered where indicated by the term signal FM and the signal transmitted by polarization modulation is cancelled.

In the receiver in FIG. 5, phase and amplitude correction circuits, not shown, similar to 42 in the transmitter, may be connected between the converters 43A and 44A and the multipliers 34 and 35. Also it is to be understood that gain controls are normally provided on the discriminators of the FM circuits 38 and 39. An $x$, $y$ monitor scope, not shown, may be connected to the outputs of difference and sum circuits to display the conventional FM on one axis or to display the polarization orientation FM on the other axis to aid in making adjustments. The adjustments can be judged by the amount of crosstalk between the two outputs.

The modulation of the orientation angle of linear polarization has the inherent advantages of some privacy and reduced sensitivity to jamming. Where privacy and anti-jamming are primary requirements, the input to the multivibrator 17 may be a code developed for the purpose.

The transmitter and receiver of FIGS. 1 and 3 or FIGS. 4 and 5 may be installed at separate sites for one-way communication. Alternatively, a transmitter and receiver for use at different times may be installed at the same site, in which case they would share one pair of antennae and such other circuit sections that lend themselves to such sharing.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A transmitter for modulating the orientation angle of linear polarization of a carrier in accordance with a signal comprising:

means for generating two sinusoids of identical frequency, equal amplitude and 90° out of phase, at two outputs respectively, a pair of sampling gates connected to the outputs of said sinusoid generating means, means for transmitting gating voltage pulses to both sampling gates at a pulse repetition frequency having a center frequency equal to the frequency of said sinusoids, said pulse transmitting means having a signal input terminal and being operable in response to a time-varying signal input to frequency modulate the pulse repetition frequency of the gating pulses according to the time-varying signal, a pair of box car generator means connected to the outputs of the respective sampling gates, a pair of low pass filter means connected to the outputs of the box car generator means, a source of said carrier, a pair of multiplier means connected to the outputs of the low pass filter means, means for coupling the output of said carrier source to said pair of multiplier means, and a pair of crossed dipoles connected to the outputs of said multiplier means.

2. A transmitter as defined in claim 1 wherein said carrier source includes an input for signals, said carrier source being operable to frequency modulate the carrier in accordance with input signals.

3. A radio communication system comprising transmitting means that includes means for generating two sinusoids of identical frequency, equal amplitude, and 90° out of phase, at two outputs respectively, a pair of sampling gates connected to the outputs of said sinusoid generating means, means for providing gating voltage pulses to both sampling gates at a pulse repetition frequency having a center frequency equal to the frequency of said sinusoids, said means having a signal input terminal and being operable in response to a time-varying signal input to frequency modulate the pulse repetition frequency of the gating pulses according to the time-varying signal, box car generator means connected to the outputs of the respective sampling gates, low pass filter means connected to the outputs of each of the box car generator means, a source of said carrier, a pair of multiplier means connected to the outputs of the low pass filter means, means for coupling the output of said carrier source to said pair of multiplier means, a pair of crossed dipoles connected to the outputs of said multiplier means to radiate radio frequency energy with varying angular orientation of linear polarization in a predetermined relationship with the input signal; and a receiver means for the radio frequency energy and operable for detecting the signal.

4. A communication system as defined in claim 3 wherein said receiver means includes a second pair of crossed dipoles, a second means having two outputs for providing two sinusoids of identical frequency, lower than that of said carrier, equal amplitude, and ninety degrees out of phase, at its respective outputs, a second pair of multipliers coupled to said second pair of crossed dipoles and to the outputs of said second means, means for summing the outputs of said second pair of multipliers, and means coupled to the output of said summing means for separating out said signal.

5. A communication system as defined in claim 4 wherein said transmitter carrier source includes a signal terminal, and said source being operable to FM-modulate the carrier with the signal input at its signal terminal, and wherein said means coupled to the output of said summing means in said receiver operates to separate out each of the signals.

* * * * *